United States Patent
Takken

(10) Patent No.: US 8,295,270 B2
(45) Date of Patent: Oct. 23, 2012

(54) INTERNET TELEPHONY SYSTEM FOR ENABLING INTERNET TELEPHONE ACCESS FROM TRADITIONAL TELEPHONE INTERFACE

(75) Inventor: Todd E. Takken, Mt. Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 2068 days.

(21) Appl. No.: 10/147,730

(22) Filed: May 16, 2002

(65) Prior Publication Data
US 2003/0214940 A1    Nov. 20, 2003

(51) Int. Cl.
H04L 12/66 (2006.01)

(52) U.S. Cl. .......... 370/352; 370/356

(58) Field of Classification Search .......... 370/351–356, 370/401–402, 395.52
See application file for complete search history.

(56) References Cited

U.S. PATENT DOCUMENTS

| | | | | |
|---|---|---|---|---|
| 5,712,907 | A * | 1/1998 | Wegner et al. | 379/114.02 |
| 5,864,607 | A | 1/1999 | Rosen et al. | 379/90.01 |
| 5,867,494 | A * | 2/1999 | Krishnaswamy et al. | 370/352 |
| 5,953,322 | A | 9/1999 | Kimball | 370/328 |
| 5,974,043 | A | 10/1999 | Solomon | 370/352 |
| 6,011,794 | A | 1/2000 | Mordowitz et al. | 370/3 |
| 6,018,571 | A | 1/2000 | Langlois et al. | 379/207 |
| 6,067,350 | A * | 5/2000 | Gordon | 379/90.01 |
| 6,137,877 | A * | 10/2000 | Robin et al. | 379/352 |
| 6,282,192 | B1 * | 8/2001 | Murphy et al. | 370/352 |
| 6,307,853 | B1 * | 10/2001 | Storch et al. | 370/354 |
| 6,310,948 | B1 * | 10/2001 | Nemeth | 379/213.01 |
| 6,389,007 | B1 * | 5/2002 | Shenkman et al. | 370/352 |
| 6,389,119 | B1 * | 5/2002 | McBride | 379/93.01 |
| 6,415,027 | B1 * | 7/2002 | Malik | 379/221.01 |
| 6,442,169 | B1 * | 8/2002 | Lewis | 370/401 |
| 6,463,053 | B1 * | 10/2002 | Chen | 370/352 |
| 6,532,366 | B1 * | 3/2003 | Chung et al. | 455/445 |
| 6,542,472 | B1 * | 4/2003 | Onuma | 370/253 |
| 6,570,869 | B1 * | 5/2003 | Shankar et al. | 370/352 |
| 6,597,688 | B2 * | 7/2003 | Narasimhan et al. | 370/353 |
| 6,608,893 | B1 * | 8/2003 | Fleming et al. | 379/230 |
| 6,751,210 | B1 * | 6/2004 | Shaffer et al. | 370/352 |
| 6,760,324 | B1 * | 7/2004 | Scott et al. | 370/352 |
| 6,789,120 | B1 * | 9/2004 | Lee et al. | 709/227 |
| 7,020,132 | B1 * | 3/2006 | Narasimhan et al. | 370/355 |
| 7,020,268 | B2 * | 3/2006 | Pelletier et al. | 379/230 |
| 7,092,380 | B1 * | 8/2006 | Chen et al. | 370/352 |
| 7,120,469 | B1 * | 10/2006 | Urakawa | 455/564 |
| 7,127,043 | B2 * | 10/2006 | Morris | 379/37 |
| 7,206,850 | B2 * | 4/2007 | Ogawa | 709/229 |
| 7,239,631 | B1 * | 7/2007 | Prehofer | 370/389 |
| 7,336,649 | B1 * | 2/2008 | Huang | 370/352 |
| 7,505,451 | B2 * | 3/2009 | Hashizume et al. | 370/352 |
| 2002/0122547 | A1 * | 9/2002 | Hinchey et al. | 379/221.01 |
| 2003/0002637 | A1 * | 1/2003 | Miyauchi et al. | 379/93.01 |
| 2004/0249649 | A1 * | 12/2004 | Stratton et al. | 705/1 |

\* cited by examiner

*Primary Examiner* — Dang Ton
*Assistant Examiner* — Brian O Connor

(57) ABSTRACT

Automatic selection and establishment of a communications connection between a telephone device to a receiver device, including entering an address of a receiver device into the telephone device for initiating the communications connection to the receiver device, and automatically selecting a communications network for establishing the communications connection to the receiver device, and selecting the communications network from an internet-based network, a hybrid telephone/internet network, and a telephone network. Automatically determine network access capabilities of the receiver device based on the address of the receiver device, and automatically evaluate the cost of establishing a communications connection for each of the communications networks which the receiver device is capable of accessing. The communications network with the lowest cost is selected, automatically initiating the communications connection to the receiver device by selecting a network access device for connecting to the selected communications network, and transmitting the address of the receiver device to the selected communications network.

8 Claims, 5 Drawing Sheets

INTERNET TELEPHONY SYSTEM FOR ENABLING INTERNET TELEPHONE ACCESS FROM TRADITIONAL TELEPHONE INTERFACE

BACKGROUND OF THE INVENTION

1. Field of the Invention

The present invention relates to internet telephone communications and, more particularly, to internet telephone communications using a standard telephone device.

2. Brief Description of Related Developments

A local telephone call using a telephone network is usually an inexpensive means of establishing a local communications connection between a caller and a receiver. In contrast, a long distance telephone call using a telephone network is often one of the most expensive means of establishing a communications connection between a caller and a receiver. There are less expensive methods of establishing a communications connection between a caller and a receiver, such as using the internet network to establish a free audio communications connection. The internet portion of the connection can replace either the long distance portion of the telephone communication or can replace the entire telephone network communication. Existing internet telephone software, such as that from net2phonedirect.com, allows a user to place an internet telephone call from a computer which is equipped with a headset.

The user of the telephone network has a high likelihood of being able to contact a particular receiver, as virtually every person and business have a telephone, or access to a telephone, for receiving telephone calls. In addition, the telephone network is very simple to use for both local and long distance calls, as the caller need only enter a telephone number on a simple, inexpensive telephone handset to establish a telephone call. In contrast, internet network telephony requires a relatively expensive computer (compared to the cost of a telephone) for the calling device and the receiver must have another computer as the receiving device. Furthermore, the caller must have some technical expertise to operate the computer and to establish a communications connection using the internet network, including knowing the internet address of the receiving device.

Another drawback with internet telephony is that computers are not as prevalent as telephones. This limits the number of potential receivers to whom an internet telephony call can be completed, especially when compared with the number of potential receivers with telephones. Furthermore, even callers and receivers with computers do not necessarily have access to the internet network, and therefore cannot place or receive telephone calls via the internet network.

It would be advantageous to be able to automatically select the least expensive method of placing a telephone call, and also to place the telephone call using only a telephone handset and a telephone number. Furthermore, it would also be advantageous to be able to contact all receivers who have a telephone. It would be further advantageous to be able to automatically use the free internet network for telephony if both the caller and receiver are equipped to make such a communications connection.

SUMMARY OF THE INVENTION

The present invention is directed to a method for automatically selecting and establishing a communications connection between a telephone device and a receiver device. In one embodiment, the method includes entering an address of the receiver device into the telephone device for initiating the communications connection to the receiver device. The method further includes automatically selecting a communications network for establishing the communications connection to the receiver device, including selecting the communications network from an internet-based network, a hybrid telephone/internet network, and a telephone network, and automatically determining network access capabilities of the receiver device.

The method further includes automatically initiating the communications connection to the receiver device by selecting a network access device for connecting to the selected communications network. The address of the receiver device is transmitted to the selected communications network.

In one aspect, the present invention is directed to a telephony system for automatically selecting and establishing a communications connection to a receiver device. In one embodiment, the telephony system, comprises a telephone device for entering an address of the receiver device for initiating a communications connection to the receiver device, and for creating an address signal. An internet telephony device is in communication with the telephone device for obtaining the address signal of the receiver device, and for transmitting the address signal for analysis of the address signal.

An internet telephony selection device is in communication with the internet telephony device for receiving the address signal of the receiver device and for automatically determining network access capabilities of the receiver device. The internet telephony selection device also automatically selects a communications network from an internet-based network, a hybrid internet/telephone network, and a telephone network and provides a command signal to the internet telephony device indicating the selected communications network. The telephony system includes a network access device for receiving a command signal from the internet telephony device for establishing a communications connection to the selected communications network.

In another aspect, the present invention is directed to a method for automatically replacing a first communications connection between a calling device and a receiver device employing a telephone network with a second communications connection employing an internet network, where the receiver device is capable of a employing the internet network for a communications connection.

The method includes determining if the calling device is capable of receiving the second communications connection via the internet network, and if so, establishing the second communications connection. The second communications connection is established by automatically disconnecting the telephone network communications connection between the calling device and the receiver device, and automatically establishing the second communications connection employing the internet network between the receiver device and the incoming calling device. The first communications connection is disconnected and the second communications connection is established without apparently interrupting communications between a caller using the calling device and a receiver using the receiver device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
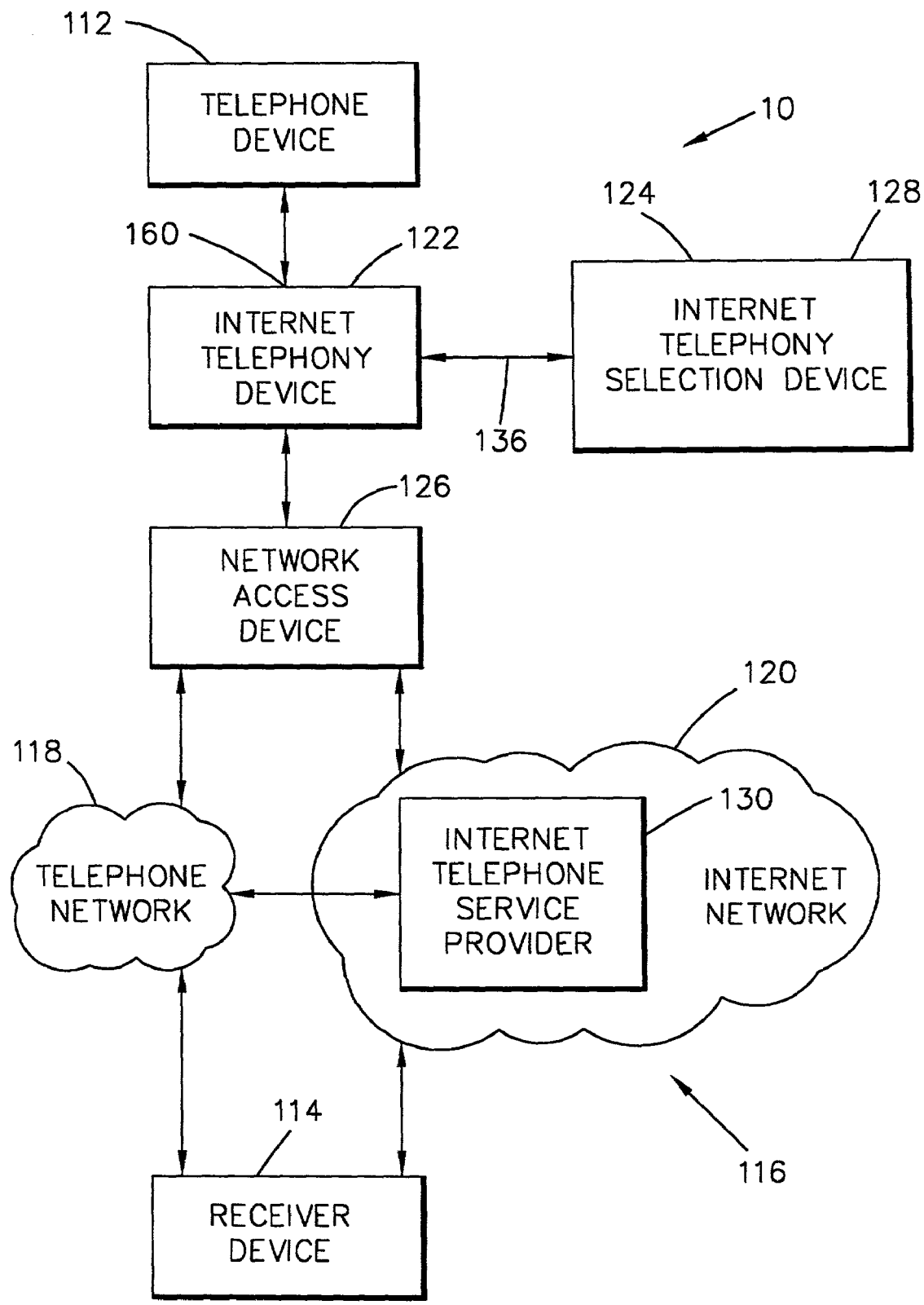
FIG. 1 is a block diagram of an embodiment of an internet telephony selection system illustrating features of the present invention.

Referring to FIG. 1, there is shown a diagram of a telephony system 10 incorporating features of the present invention. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, the telephony system 10 generally illustrates an embodiment of the invention for automatically selecting the least expensive method of placing a telephone call. The telephony system 10 combines the convenience of establishing long distance telephone calls from a standard telephone device 112 with the low cost of having these calls conducted over the internet network 120, when possible. Furthermore, all receivers with a receiver device 114, such as a telephone, can be contacted.

The telephony system 10 generally comprises an internet telephony device 122 connected to the telephone device 112 for receiving an address of the receiver device 114 from telephone device 112 and for accessing a selected communications network 116. The internet telephony device 122 and the telephone device 112 control the establishment of individual communication connections. Continuing with FIG. 1, the internet telephony device 122 is in communication with an internet telephony selection device 124 for receiving the address of the receiver device 114 and automatically selecting the communications network 116 from either a telephone network 118 or the internet network 120. The internet telephony selection device 124 can run on a processor device 128, such as a computer 128. In an alternate embodiment, the processor 128 can be any suitable device that provides control commands to the internet telephony device 122. The internet telephony selection device 124 automatically determines which of the communications networks 118, 120 the receiver device 114 is capable of accessing. The internet telephony selection device 124 can also be adapted to automatically determine the cost of establishing a communications connection via each of the communications networks 116.

The communications connection is generally automatically established over the low cost communications network 118, 120 as the internet telephony device 122 receives a selection command from the internet telephony selection device 124 and connects to a network access device 126. For a receiver device 114 which is not directly accessible through the internet network 120, such as a standard telephone, an internet telephone service provider (ITSP) 130 can be contacted through the internet network 120 to establish the communications connection to the receiver device 114.

Referring to FIG. 1, to the telephone device 112 is generally adapted to convert the telephone number of the receiver device 114 to an address signal which is transmitted to the internet telephony device 122. Input to the telephone device 112 can include keystrokes on a telephone pad, and voice commands and information. The telephone device 112 provides functionality similar to a telephone handset and is operated in the standard manner for establishing and receiving a communications connection, such as a telephone call.

The telephone device 112 does not have to be a computer or a specialized device for accessing the internet network, and the user of the telephone device 112 does not necessarily know or need to know which communications network 116 has been selected for use. If a communication connection is established via the internet network 120, the user is not required to enter an internet IP address via the telephone device 112. In one embodiment, the caller can override the automatic selection of the communications network 116 by the internet telephony selection device 124 by entering command sequences on the telephone device 112 along with entering the address of the receiver device 114. While an address which is a telephone number has been described, the present invention is not so limited, as the address can be an internet address without departing from the broader aspects of the present invention.

Referring to FIG. 1, the internet telephony device 122 can have a separate housing which can include a traditional analog telephone port 160 for connection to the telephone device 112. The internet telephony device 122 includes sufficient internal processing power to exchange signals, such as command signals and the data signals, with the processor 128 over a channel 136. The data signals from the telephone device 112 can include the telephone number address signal. The internet telephony device 122 can signal to the processor 128 whether the telephone device 112 is off the hook, and therefore on, or whether the telephone device 112 is on the hook, and therefore hung up or off. Command signals from the internet telephony selection device 124 can direct the internet telephony device to connect to the selected communications network 116, and can pass the receiver device 114 address to the selected network 116, such as by dialing a telephone number or transmitting an internet address.

The internet telephony device 122 can also include analog/digital (A/D) converters for converting analog audio signals from the telephone device 112 to digitized audio signals for transmission over the channel 136 between the internet telephony device 122 and the processor 128. Furthermore, the internet telephony device 122 can monitor the telephone device 112 for incoming signals and transmit signals to the processor 128 and the internet telephony selection device 124 that an incoming call is being established to the telephone device 112. The incoming call can be forwarded to the internet telephony 124 for analysis before command signals are issued to the internet telephony device 122 to transmit the incoming call to the telephone device 112.

As shown in FIG. 1, the internet telephony selection device 124 can manage inbound and outbound communications connections for the telephone device 112. The internet telephony selection device 124 can include a conversion module for converting analog audio signals from the telephone device 112 to digitized audio signals and to format for transmission over a digitized communications network, such as the internet network 120. The internet telephony selection device 124 can also convert digital signals received from the internet network 120 into audio signals for transmitting to the internet telephony device 122 and to the telephone device 112.

Initial installation of the internet telephony selection device 124 can require input from an input device of the processor 128, such as a keyboard, voice analyzer, or mouse, or other non-telephone interface. As part of the installation, account configuration information for the internet telephony selection device 124 can be entered and set up on the processor 128 input device. In addition, the internet telephony selection device 124 can include a file of telephone prefixes on the processor 128 for determining whether the communications connection to a receiver device 114 is a long distance communications connection.

Continuing with FIG. 1, the internet telephony selection device 124 also can include data files containing internet protocol (IP) addresses of receiver devices 114 with the corresponding telephone numbers of the receiver devices 114 for translating a telephone number entered on the telephone device 112 into an IP address. This translated receiver device address can be provided to the internet telephony device 122 for establishing a communications connection. The IP address file can also be used to determine whether the receiver device 114 is capable of conducting a communications connection over the internet network 120.

The internet telephone selection device 124 also can access a remote database containing internet protocol (IP) addresses of receiver devices 114 and the corresponding telephone numbers of the receiver devices 114 for translating a telephone number entered on the telephone device 112 into an IP address. The remote database could be located on a computer of the ITSP 130, or could be located elsewhere on the internet network 120, such as on another server. In another embodiment, the internet telephone selection device 124 could use a combination of local data files and the remote address database to translate a telephone number entered on the telephone device 112 to an IP address of the receiver device 114. The local data files can serve as a cache of most frequently accessed addresses to provide for quicker, more efficient translations.

The IP address, or internet address, is a series of four numbers separated by periods, and refers generally to non-telephone number addresses used to reach an internet-enabled device. The IP address numbers are mapped to internet network names, such as ibm.com, by internet network name servers, or computers, which provide lookup tables for translating the numbers to names. Email addresses are not commonly used for real-time communication sessions. In another embodiment, email addresses, and the addressing scheme used for real-time messaging networks, such as Yahoo™ Instant Messenger™, could also be used for real-time telephone communication over the internet network 120.

The internet telephony selection device 124 can assist the caller in directly entering an internet or email address by simplifying the key strokes for entering the internet or email address into the telephone device 112. In addition, the input device of the processor 128 can be used to manually control the entering of a telephone number, email address, or internet address. If the internet telephony device 122 or the internet telephony selection device 124 is inactive, the telephone device 112 can operate as a standard telephone for use on the telephone network 118.

Referring to FIG. 1, the internet telephony selection device 124 runs on the processor 128 and can include, for example, a dedicated integrated processing unit or a personal computer. In addition to the previously mentioned devices, the processor 128 can have non-volatile and volatile memory, a processing unit, a display device, such as a monitor, and input and output devices, such as keyboards, printers and network connectors for local area networks as well as for internets and intranets.

Continuing with FIG. 1, the network access device 126 receives signals from the internet telephony device 122 for accessing the internet network 120. The network access device 126 can send and receive signals to and from the internet network 120 via a cable modem, a DSL modem, an ISDN modem, a cellular modem or a wireless modem, or such other suitable communication interface.

The telephone network 118 shown in FIG. 1 is a fee-for-access network which can be accessed for audio and data communication with simple, easy to use devices, such as a telephone. Most of the population of the United States has access to the telephone network for establishing and receiving audio communication connections. The telephone network is available worldwide. In this application, the phrase "telephone network" refers to the above use of the telephone network 118. "Telephone network" does not include the use of the telephone network 118 for hosting much of the internet network 120, or as one of the primary means of accessing the internet network 120.

Continuing with FIG. 1, the internet network 120 is a network, or plurality of networks, of computers providing access to many computers and computer-like devices around the world. Currently, there is no per minute, per connection or per data volume charge for using the internet network 120 for real-time audio transmission, such as internet telephony. To establish a connection for internet telephony, both the sending and receiving computers must be executing software capable of the real-time transmission of audio.

The internet network 120 includes a number of different types of service providers, such as internet service providers (ISPs) which provide general access to the internet network 120. Another service provider is the internet telephone service provider (ITSP) 130 which can establish a communications connection between a computer connected to the internet and a standard telephone receiver via the telephone network 118. The communications connection is via a local telephone call, if possible, to minimize connection costs.

Referring to FIG. 1, the internet telephone service provider (ITSP) 130 can establish a communications connection to the receiver device 114 using the telephone number of the receiver device 114. The ITSP 130 can be contacted by the internet telephony device 122 through an ISP, or directly if a local telephone connection or toll-free telephone connection exists to the ITSP 130. The ITSP 130 can include a telephone prefix database for determining whether a telephone network 118 communications connection established by the ITSP to a receiver device 114 would be a local connection or a long distance connection. The telephone prefix database can be downloaded from the ITSP 130 to the internet telephony selection device 124.

The receiver device 114 shown in FIG. 1 is preferably a standard telephone device for responding to incoming calls and placing outgoing calls on the telephone network 118. The receiver device can also be a computer with internet telephony capable software for establishing a communications connection directly over the internet network 120. Furthermore, the receiver device 114 can be an embodiment of the internet telephony system 10 for placing and receiving calls over the telephone network 118, the internet network 120, or a combination thereof 116 including using an internet telephony service provider 130.

Figure 2:
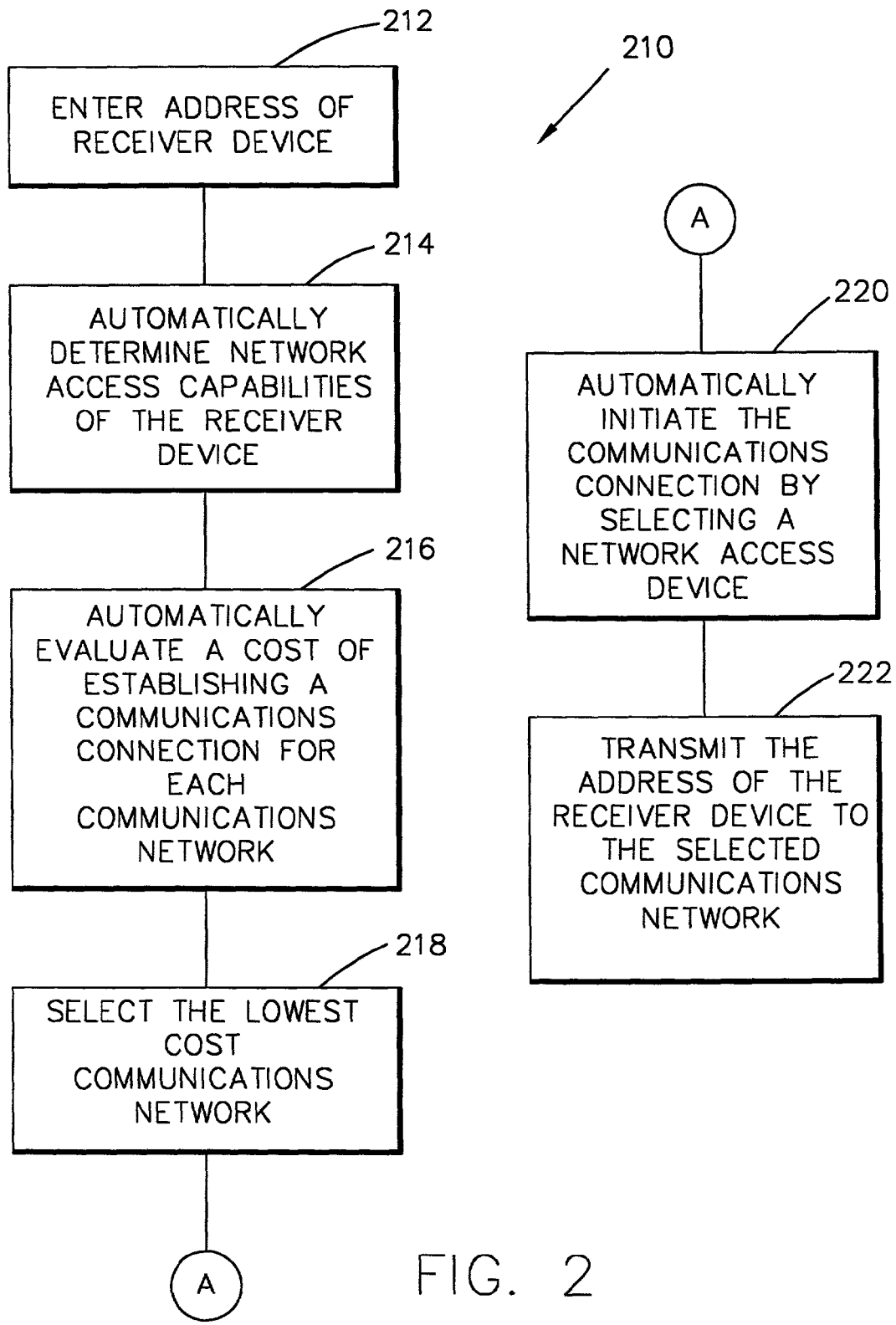
FIG. 2 is a flowchart illustrating an embodiment of the present invention for establishing an internet telephony communications connection.

FIG. 2 shows a method 210 for establishing a communications connection using a standard telephone. In a step 212, the address of the receiver device 114 is entered into the telephone device 112. As shown in step 214, the internet telephony selection device 124 automatically determines the network access capabilities of the receiver device 114. In a step 216, the internet telephony selection device 124 automatically evaluates the cost of establishing a communications connection for each of the communications networks 116 which the receiver device 114 is capable of accessing.

Continuing with FIG. 2, and in a step 218, the internet telephony selection device 124 selects the communications network 116 having the lowest cost, and in a step 220, automatically initiates the communications connection by selecting the appropriate network access device 126 to access the selected communications network 116. In a step 222, the internet telephony device 122 transmits the address of the receiver device 114 to the selected communications network 116 to establish the communications connection with the receiver device 114.

Figure 3:
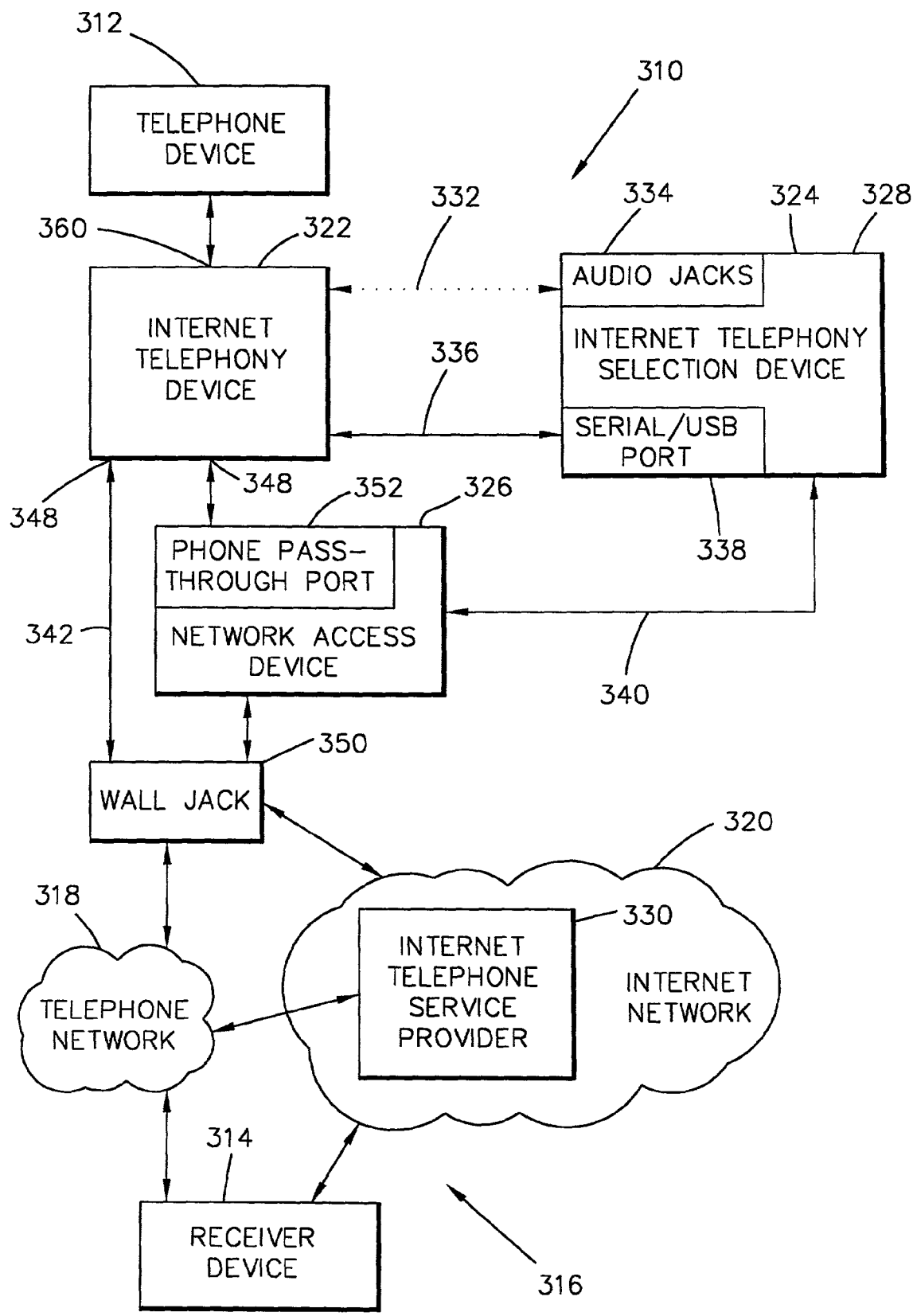
FIG. 3 is a block diagram of another embodiment of an internet telephony selection system illustrating features of the present invention.

Referring to an alternate embodiment of the present invention as shown in FIG. 3, the internet telephony system 310 can include an internet telephony device 322 having one or more wall jack ports 348 for connection either to a phone-pass through port of a modem 326 or other network access device 326, or for direct connection 342 to a telephone wall jack 350. In cases where the wall jack port 348 accesses a telephone network 318 by other than a traditional analog line, the internet telephony device 322 can include the wall jack port 348 conforming to this other format.

Continuing with FIG. 3, the internet telephony device 322 further can include an analog audio channel 332 for connecting to a separate processor 328 or separate computer 328. The audio channel 332 can be carried through an analog audio port 334 to the computer 328. A digital command channel 336 can connect the internet telephony device 322 to the processor 328 or the computer 328 for receiving commands for communications network 316 selection. Commands can also include the address of the receiver device 314. The digital command channel 336 can be carried through a serial, USB, or other digital port 338.

Continuing to refer to FIG. 3, the internet telephony device 322 can signal to the processor 328 when an incoming telephone call is received by the wall jack port 348, and can switch the telephone connection between the computer-connected audio channel and the wall jack port 348 based on commands from the processor 328. The processor 328 can include hardware for voltage conversion of signals transmitted to the internet telephony device's 322 analog telephone port and the analog computer audio port and audio channel from the network access device 326.

As shown in FIG. 3, the processor 328 can include an analog audio channel 332 for connecting to the internet telephony device 322. The audio channel 332 can be carried through an analog audio port 334 to the processor 328. The analog audio signals can be digitized by the optional A/D converters in the processor 328. The processor also can include a digital command channel 336 connecting the internet telephony device 322 to the processor 328 for transmitting commands for communications network 316 selection.

Referring to FIG. 3, the processor 328 can have a direct connection 340 to the network access device 326 for establishing and communicating directly with the internet network 320 without sending signals through the internet telephony device 322. The network access device 326 can also include a phone pass-through port 352 for receiving telephone signals from the internet telephony device 322 and passing the telephone signals to the telephone network through a wall jack 350.

As shown in FIG. 3, the wall jack 350 can provide a connection to the telephone network 318. The wall jack 350 can be a traditional analog telephone line, the telephone connection on an ISDN line, a telephone port on a wireless or cellular modem, or any other telephone network 318 connection. The wall jack 350 can also include an ethernet connection to the internet network 320.

Figure 4:
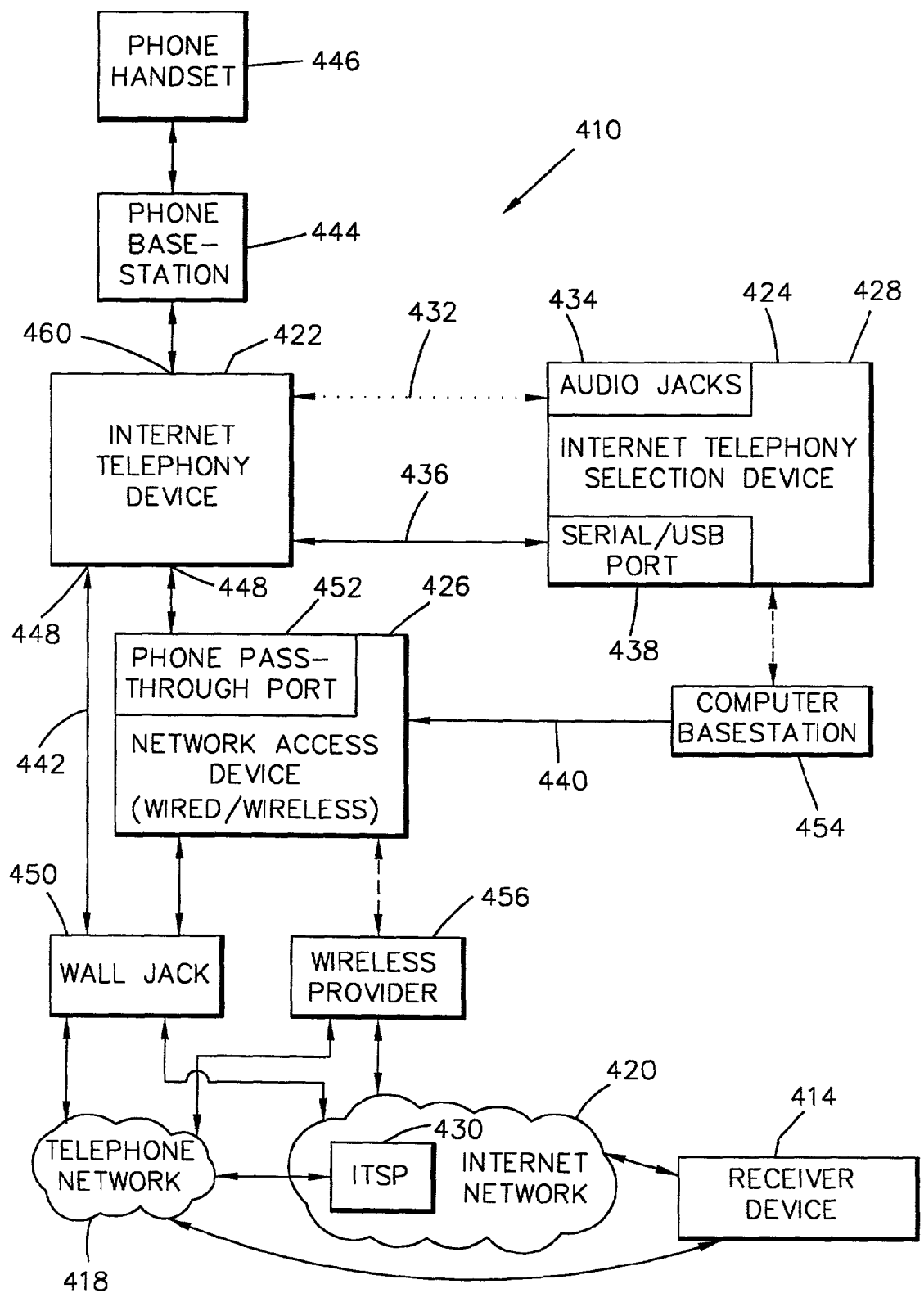
FIG. 4 is a block diagram of a further embodiment of an internet telephony selection system illustrating features of the present invention.

Referring to FIG. 4, a further embodiment of the internet telephony software system 410 can include wireless connections between a phone handset 446 and a phone base station 444. The phone handset 446 and the phone base station 444 are similar to the telephone device 112 of FIG. 1. The phone base station 444 can be connected to an internet telephony device 422 by standard communications methods, such as electrical or optical connections.

Continuing with FIG. 4, a wall jack 450 can provide a wired or wireless connection to the telephone network 418 or internet network 420. In addition, a network access device 426 can be in wireless communication with a wireless provider 456, which provides a communications connection to a telephone network 418 or an internet network 420, as desired. A processor 428 hosting an internet telephony selection device 424 can be in wireless contact with a computer base station 454 for communicating with the network access device 426.

Figure 5:
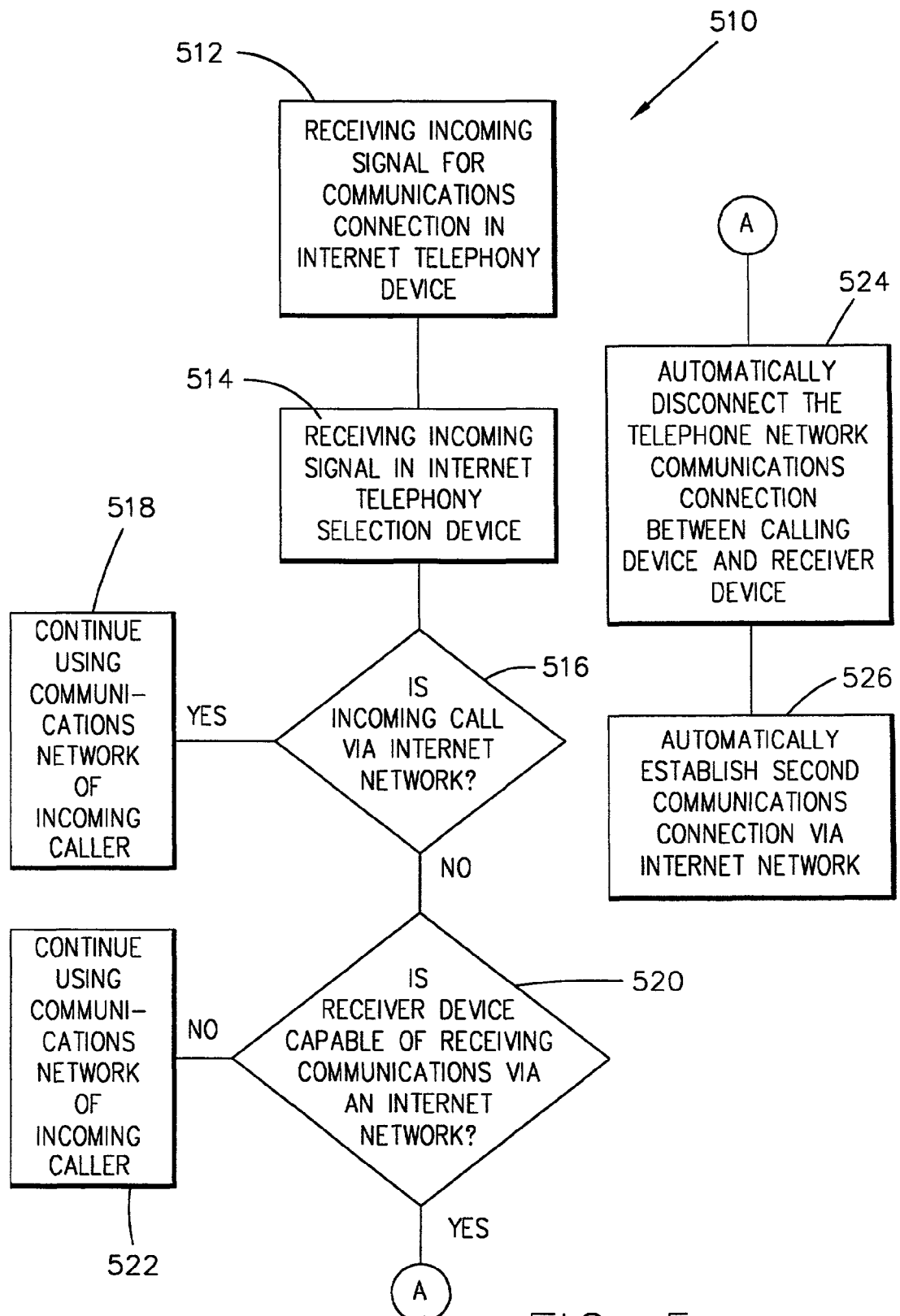
FIG. 5 is a flowchart illustrating an embodiment of the present invention for automatically receiving a telephone call.

FIG. 5 shows a method 510 for receiving a communications connection, reviewing the communications connection, and, if warranted, establishing a new communications connection. The embodiments of the present invention shown in FIGS. 1, 3 and 4 are also capable of receiving internet telephone communications connections.

In a step 512, an incoming communications signal is received by the internet telephony device 122 from a calling device, such as the receiver device 114, for establishing a communications connection. In a step 514, the incoming communications signal is transmitted by the internet telephony device 122 and received by the internet telephony selection device 124, which determines, in a step 516, whether the incoming call is being received via the internet network 120.

Continuing with FIG. 5, in a step 518, if the incoming call is via the internet network 120, continue using the communications network 120 of the incoming caller. The calling device, such as the receiver device 114, can place identification sounds in a short initial period of the call to indicate that the communications connection is being established by an internet telephony ready device and/or via the internet network.

If the incoming call is not being established via the internet network, in a step 520, determine if the receiver device 114 of the incoming caller is capable of receiving a communications connection using the internet network 120. If the receiver device 114 of the incoming caller is not capable of receiving a communications connection via the internet network 120, in a step 522, continue using the existing communications network 116 used by the incoming call.

As shown FIG. 5, if the receiver device 114 of the incoming call is capable of receiving a communications connection via the internet network 120, in a step 524, automatically disconnect the telephone network 118 communications connection between the receiver device 114 of the incoming call and the telephone device 112. In a step 526, automatically establish a second communication connection directly via the internet network between the telephone device 112 and the receiver device 114 of the incoming call.

The receiver device 114 of the incoming call then becomes i the receiver of the communications connection, while the internet telephony selection device 124 becomes the initiator of the communications connection. The above reconnection procedure reduces the communications connection costs for the receiver device 114, as a long distance telephone call is exchanged for a free internet communications connection. However, the initial communications connection recipient would not gain any cost savings. Furthermore, the establishment of the communications connection could be delayed. To avoid these possible disadvantages, the call recipient has an option to disable the functioning of the reconnection procedure. However, even if the reconnection procedure is disabled, the receiver device 114 can use the internet telephone service provider 130 to reduce communications connection costs, compared with the costs of a long distance telephone call.

In another embodiment, the internet telephony device 422 can be integrated with a cordless telephone base station 444, and either bundled with a cordless telephone handset 446 or integrated with the telephone handset 446, and a dedicated computer in a single housing and bundled with a computer base station 454. The base station 454 and the bundle can have a cordless radio connection 456 to the communication networks 416. In a further embodiment, the internet telephony device 422 can also communicate through the computer 428 to any type of network access device 426, and can share the network access device 426 with other networked devices. The network access device 426 can also be integrated with the internet telephony device 422.

Further alternate embodiments of the internet telephony system 10 can include a single digital channel between the internet telephony device 122 and the internet telephony selection device 124 for carrying both command signals and audio signals. The audio signals to and from the telephone device 112 can be converted between analog and digital formats by hardware included in the internet telephony device 122. The internet telephony device 122 can also be embodied as an expansion card inserted into the processor 328, such as the personal computer 328.

The telephony system 10 of the present invention can place a telephone call using only a telephone handset and a telephone number, and can contact all receivers who have a telephone. The telephony system 10 can automatically select the least expensive method of placing a telephone call. It can automatically use a hybrid telephone/internet network connections, such as that provided by an ITSP, when this would reduce connection charges to non-internet-enabled receiver devices. The telephony system 10 automatically determines the relative costs of using a telephone network, a hybrid internet/telephone network connections, such as provided by an ITSP, and an internet network connection. Even if the receiving device lacks internet connection capabilities, the internet telephony selection device can use the hybrid network connection, such as that provided by an ITSP, in cases where doing so would lower the connection cost.

In addition, it can automatically use the free internet network for telephony if both the caller and receiver are equipped to make such a communications connection.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for automatically selecting and establishing a communications connection between a telephone device to a receiver device, the method comprising:
    entering an address of the receiver device into the telephone device for initiating the communications connection to the receiver device;
    automatically determining network access capabilities of the receiver device;
    automatically selecting a communications network adapted to be used for establishing the communications connection to the receiver device, including:
        automatically determining a cost of establishing a communications connection for each communications network the receiver device is capable of accessing; and
        selecting the lowest cost communications network of the evaluation from an internet-based network, a hybrid telephone/internet network, and a telephone network;
    automatically initiating the communications connection to the receiver device by selecting a network access device for connecting to the selected communications network;
    transmitting the address of the receiver device to the selected communications network; and
    overriding said automatically selecting a communications network if command sequences are entered on said telephone device along with said address of the receiver device.

2. The method of claim 1, wherein entering the address of the receiver device includes entering a telephone number.

3. The method of claim 1, wherein the receiver device is a telephone device.

4. The method of claim 1, wherein automatically selecting the communications network further includes:
    if the receiver device is capable of accessing only the telephone network access, automatically evaluating the cost of connecting to an internet telephone service provider via the internet-based network, wherein the internet telephone service provider automatically connects to the receiver device via the telephone network.

5. The method of claim 1, wherein automatically selecting the communications network further includes comparing the address of the receiver device with a predefined list of addresses of the telephone network for determining whether the communications connection to the receiver device is a long distance telephone call.

6. The method of claim 1, wherein automatically selecting the communications network further includes comparing the address of the receiver device with a predefined list of addresses of a plurality of receiving devices for determining whether the connection to the receiver device is determined to be a long distance telephone call.

7. The method of claim 1, wherein automatically selecting the communications network further includes comparing the address of the receiver device with an address of the telephone device and a predefined list of addresses of a plurality of receiving devices for determining whether the connection to the receiver device is determined to be a long distance telephone call.

8. The method of claim 1, wherein automatically selecting the communications network further includes accessing a remote database for determining whether the network access capabilities of the receiver device include establishing a communications connection via the internet-based network, given a telephone number of the receiver device, and, if so, translating the telephone number to an IP address for the receiver device.

* * * * *